INVENTOR.
KARL J. STIEFEL,
By *Elmer J. Gorn*
ATTY.

Patented Feb. 4, 1947

2,415,116

UNITED STATES PATENT OFFICE 2,415,116

ELECTRICAL SYSTEM

Karl J. Stiefel, Waltham, Mass., assignor to Raytheon Manufacturing Company, Newton, Mass., a corporation of Delaware Application November 30, 1944, Serial No. 565,938

9 Claims. (Cl. 171—97)

1

This invention relates to electrical systems for shaping waves, such for example as systems for producing substantially rectangular pulses of current for various purposes.

For some purposes, for example, in radar equipment, it is desired to energize an ultra-high frequency generator intermittently to conduct peak currents. The ultra-high frequency generator may be energized as frequently as 1000 times per second and the duration of each energization may be of the order of a microsecond.

To this end a wave-forming network is provided between the ultra-high frequency generator and a suitable alternating current source. Energy from the alternating current source may be stored in a suitable condenser and discharged intermittently through the pulse-forming network to energize the generator.

Prior art arrangements for such purposes have not been satisfactory for some applications due to certain limitations of the circuits and particularly to the cumbersome size and weight of the equipment required.

It is among the objects of the present invention to provide an improved system for the purposes described.

A further object of the invention is to provide a system of the type described in which the size and weight of the more cumbersome elements of the system may be substantially reduced.

Figure 1:
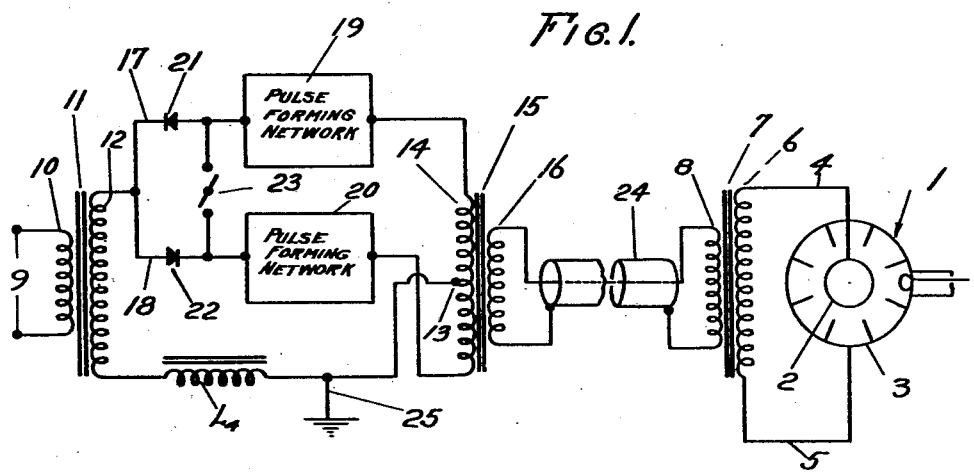
Figure 3:
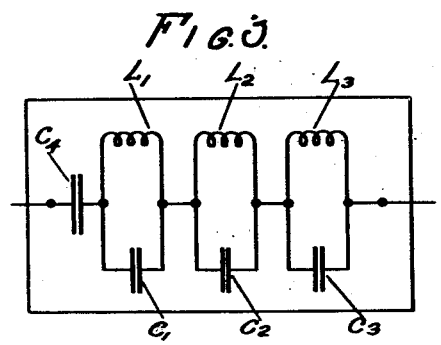
Figure 2:
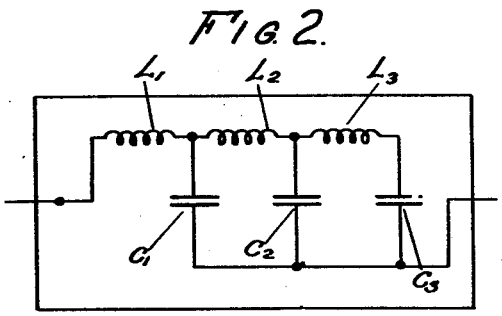
Figure 4:
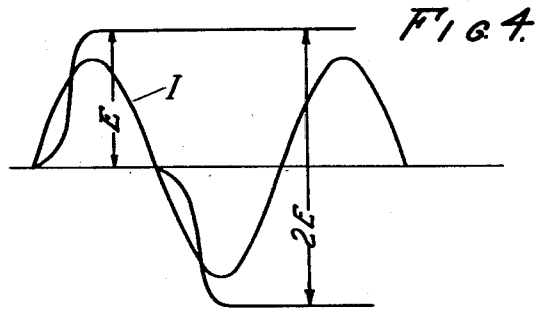

The above and other objects of the invention will be made fully apparent to those skilled in the art from a consideration of the following detailed description taken in conjunction with the accompanying drawing in which:

Fig. 1 diagrammatically illustrates an embodiment of the invention as applied to an ultra-high frequency generator of the magnetron type;

Figs. 2 and 3 represent alternative forms of pulse-forming networks suitable for use in the system shown in Fig. 1; and Fig. 4 shows a set of curves illustrating certain operating characteristics of the invention.

Referring to the drawing and first to Fig. 1 thereof, reference numeral 1 indicates a generator for producing ultra-high frequency oscillations. This generator 1 may be of any suitable type. In the instance shown the generator is of the magnetron type having a cathode 2 and an anode 3, which anode is in the form of a cylinder having inwardly projecting radial arms providing a plurality of anode faces coacting with the cathode 2 in a well-known manner. The cathode 2 and the anode 3 are connected by conductors 4 and 5, respectively, to the opposite

2 ends of a secondary winding 6 of a transformer 7 having a primary winding 8. The primary winding 8 is adapted to be supplied with pulses of current from a system including a suitable source of alternating potential connected to taps 9 of a primary winding 10 of a transformer 11 having a secondary winding 12. One end of the secondary winding 12 of the transformer 11 is connected to a center tap 13 on the primary winding 14 of a transformer 15 having a secondary winding 16. The other end of the primary winding 12 is connected by way of branch connectors 17 and 18 to a pair of pulse-forming networks 19 and 20. A pair of rectifiers 21 and 22 are included in the connectors 17 and 18, respectively. The rectifiers 21 and 22 may be of any suitable type, such as selenium cells or rectifying tubes. The rectifiers are so disposed that one is conductive when the current from the coil 12 is in one direction and the other is conductive when the current is in the opposite direction. The pulse-forming network 19 is connected to the upper end of the primary winding 14 of the transformer 15. The pulse-forming network 20 is connected to the lower end of the winding 14. A rotary spark gap 23 is connected across the connectors 17 and 18 at points between the pulse-forming network 19 and the rectifier 21 and the pulse-forming network 20 and the rectifier 22.

The pulse-forming networks 19 and 20 each include a capacity for storing energy. They may be constructed in any suitable manner; for example, each may be constructed in the form shown in Fig. 2, or in the form shown in Fig. 3. In the form shown in Fig. 2, capacitors $C_1$, $C_2$ and $C_3$ function as an energy-storing capacity distributed through the network, and also function in combination with the inductances $L_1$, $L_2$ and $L_3$ for generating a trapezoidal wave. In the form shown in Fig. 3 an energy-storing capacity $C_4$ is provided separate from capacitors $C_1$, $C_2$ and $C_3$ of the pulse line.

The secondary winding 16 of the transformer 15 is connected by way of a coaxial line 24 to the primary winding 8 of the transformer 7.

Preferably the system is grounded on the load side of the pulse-forming networks as indicated at 25. An impedance $L_4$ may be included in the line between the secondary winding 12 of transformer 11 and the center tap 13 on the primary winding 14 of transformer 15. This impedance may be a leakage inductance in the transformer 11.

The operation of the system may be best understood with reference to the set of curves shown in Fig. 4 of the drawing. Alternating current, having a frequency equal to or greater than the desired repetition frequency of the system, is applied to the terminals 9. When the charging current I is in one direction at a time when the spark gap 23 is in open position, the current flows through the branch 17 and rectifier 21 to charge the energy-storing capacity of the pulse-forming network 19, the return connection being made by way of the upper half of the primary winding 14 to the tap 13 and thence to the lower end of the primary winding 12. On the opposite half wave of the alternating current the energy-storing capacity of the pulse-forming network 20 is charged, the current flowing from the lower end of the secondary winding 12 to the tap 13 on the primary winding 14 and thence through the lower half of the primary winding 14 to the right-hand end of the pulse-forming network 20, the return connection to the upper end of the primary winding 12 being made by way of the rectifier 22. It will be seen from the foregoing that after the charging of the energy-storage capacity of the pulse-forming networks, the left side of the network 19 will constitute a source of potential having a value indicated by E in Fig. 5 and the left side of the network 20 will constitute a source of potential equal in value to E and opposite in sign. The potential applied across the spark gap 23 will therefore be equal to 2E. This is approximately equal to the sum of the peak potentials of the two half waves of the alternating current source.

When the rotary spark gap 23 fires, the energy stored in the capacity of the wave-forming networks is discharged through the primary winding 14 of the transformer 15. In the instance shown, the pulse of current is stepped down in the transformer 15, in order to limit the required length of the coaxial line 24. In the transformer 7 the pulse of current is again stepped up before being supplied to the magnetron 1.

From the foregoing it will be seen that the invention provides a system which makes use of both halves of the sine wave of current supplied by the alternating current source. Thus, the required rating of the alternator is approximately one-half of what it would be if the usual half wave charging were applied. Furthermore, the invention provides a system in which the voltage across the spark gap 23 is approximately twice the individual line voltage or four times the alternating current peak voltage. This permits the maintenance of a high voltage across the spark gap which is essential for the proper breakdown thereof without imposing high voltages across the input. Accordingly, the voltage of the impulse supplied to the primary winding 14 of the transformer 15 is substantially doubled for a given power rating of the transformer 11. As compared to a system supplying the same energy impulse to the load circuit, the power rating of the transformer 11 is greatly reduced and its size and weight accordingly decreased. Furthermore, the voltage across each of the rectifiers 21 and 22 is likewise only half of the voltage across the gap. The system, therefore, makes it possible to utilize rectifiers of the type that would not otherwise be satisfactory. Thus for small radar units suitable for use on commercial planes, it becomes possible to use selenium cells or similar rectifiers instead of a vacuum tube rectifier, thus simplifying the construction and eliminating the filament transformer necessary where diode rectifiers are used.

While the invention has been shown and described as applied to the energization of an ultra-high frequency generator, it will be apparent that the invention may be applied to other load circuits. Other modifications and variations within the scope of the appended claims will also be apparent to those skilled in the art. For example, although two arrangements of the wave-forming networks suitable for use in the combination claimed are shown, it will be apparent from these that other arrangements may be utilized.

What is claimed is:

1. In combination, a load circuit, circuit means for connecting said load circuit to a source of alternating potential, a pair of wave-shaping networks in said circuit means each having capacity for storing energy, means for charging the storage capacity of one of said networks from said source when the potential thereof is in one direction, means for charging the other of said networks from said source when the potential thereof is in the opposite direction, said wave-shaping networks being connected to opposite sides of said load circuit, and a rotary spark gap device for periodically discharging the energy stored in said networks through said load circuit.

2. In combination, a load circuit, circuit means for connecting said load circuit to a source of alternating potential, a pair of wave-shaping networks in said circuit means each having capacity for storing energy, means for charging the storage capacity of one of said networks from said source when the potential thereof is in one direction, means for charging the other of said networks from said source when the potential thereof is in the opposite direction, said wave-shaping networks being connected to opposite sides of said load circuit, and a rotary spark gap device synchronized with said source of alternating potential for periodically discharging the energy stored in said networks through said load circuit.

3. In combination, a load circuit, circuit means for connecting said load circuit to a source of alternating potential, a pair of inversely-connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and means for periodically interconnecting the ends of said networks remote from said load circuit.

4. In combination, a load circuit, circuit means for connecting said load circuit to a source of alternating potential, a pair of inversely-connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and means synchronized with said source of alternating potential for interconnecting the ends of said networks remote from said load circuit.

5. In combination, a load circuit, circuit means for connecting said load circuit to a source of alternating potential, a pair of inversely-connected rectifiers interposed in said circuit means, a pair of wave-shaping networks in said circuit means each having capacity for storing energy, one of said wave-shaping networks being connected between one of said rectifiers and one side of said load circuit, and the other of said wave-shaping networks being connected between the other of said rectifiers and the other side of said load circuit, and a rotary spark gap device for periodically interconnecting the ends of said networks remote from said load circuit.

6. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means for periodically connecting oppositely charged terminals of said networks together.

7. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means including a rotary spark gap device for connecting oppositely charged terminals of said networks together.

8. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connecting leads disposed to convey opposite charges to said networks, and means synchronized with said source of alternating potential for connecting oppositely charged terminals of said networks together.

9. An electrical system including a pair of wave-shaping networks each having capacity for storing energy, a utilization circuit into which energy from said networks is discharged, said wave-shaping networks being connected to opposite terminals of said utilization circuit, a source of alternating potential, connecting leads between said source and each of said networks, a pair of rectifiers in said connection leads disposed to convey opposite charges to said networks, and means including a rotary spark gap device synchronized with said source of alternating potential for connecting oppositely charged terminals of said networks together.

KARL J. STIEFEL.

REFERENCES CITED

The following references are of record in the file of this patent:

UNITED STATES PATENTS

| Number | Name | Date |
| --- | --- | --- |
| 1,974,328 | Bouwers | Sept. 18, 1934 |

Disclaimer 2,415,116.—*Karl J. Stiefel*, Waltham, Mass. ELECTRICAL SYSTEM. Patent dated Feb. 4, 1947. Disclaimer filed June 27, 1951, by the assignee, *Raytheon Manufacturing Company*.

Hereby enters this disclaimer to claims 1 to 9 inclusive of said patent.
[*Official Gazette August 7, 1951.*]